Figure 1:
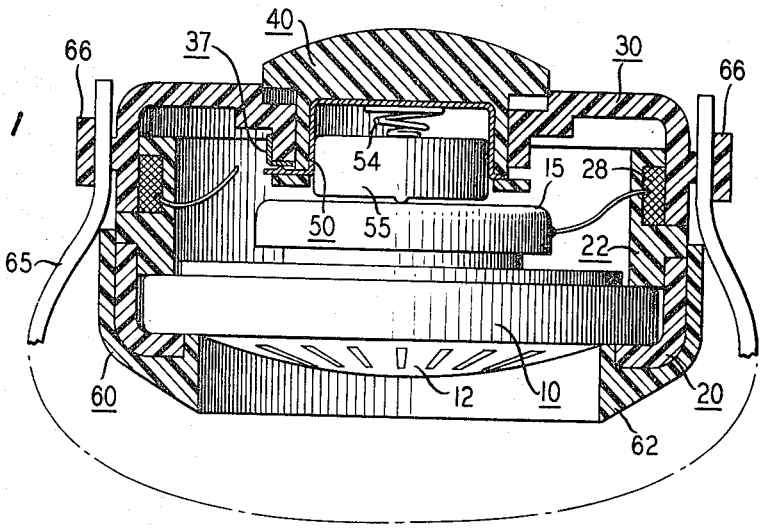
Figure 2A:
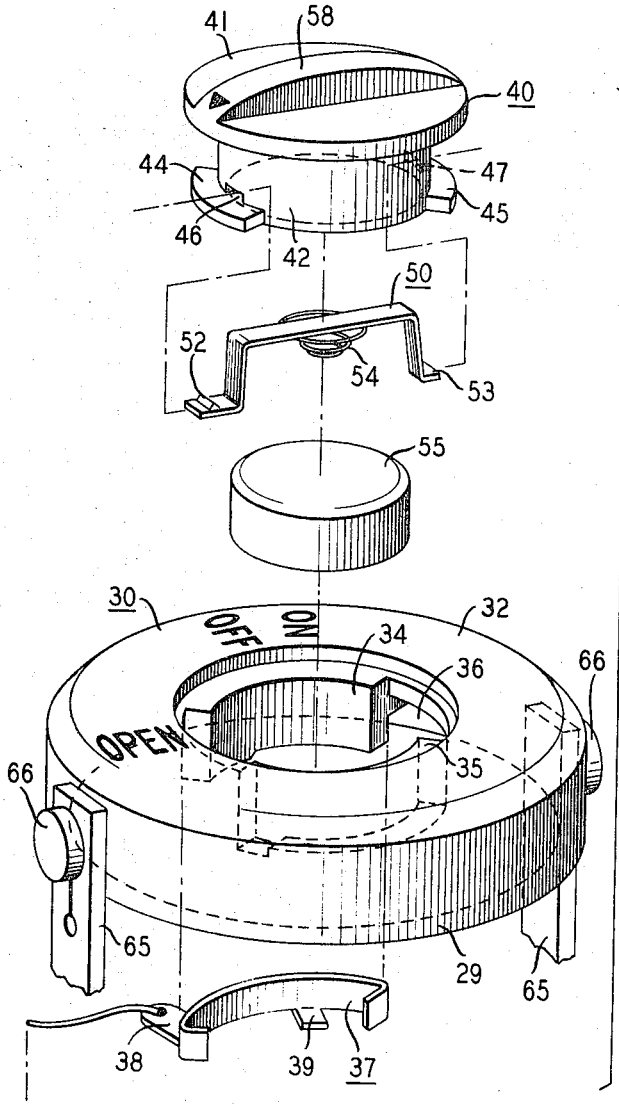
Figure 2B:
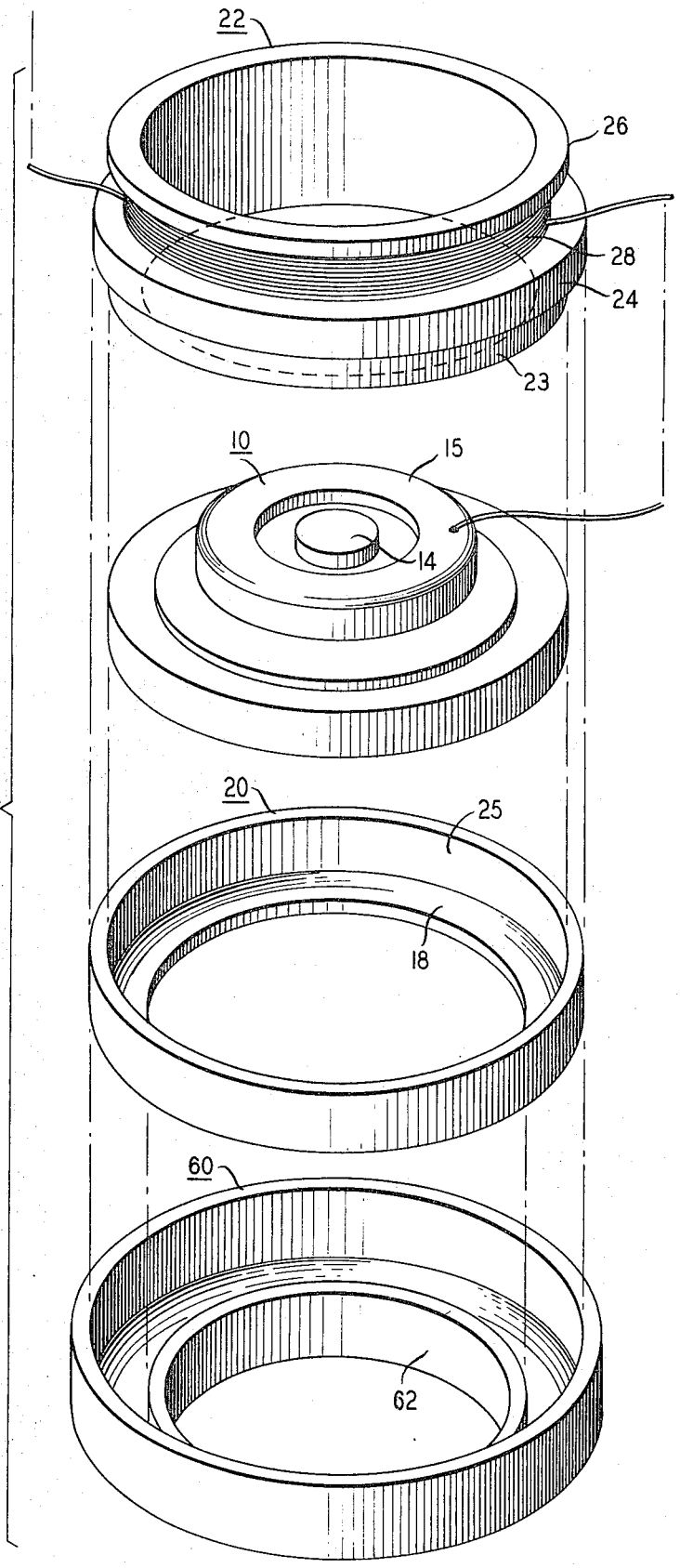

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 24, 1970

880 O.G. 1161

T880,003

ADAPTER FOR TELEPHONE RECEIVERS HAVING A SMALL STRAY MAGNETIC FIELD

Gary L. Spahn, Indianapolis, Ind., assignor to Bell Telephone Laboratories, Incorporated, Murray Hill and Berkeley Heights, N.J., a corporation of New York

Filed May 5, 1969, Ser. No. 821,692

Int. Cl. H04r *25/20*

U.S. Cl. 179—1

2 Sheets Drawing. 7 Pages Specification

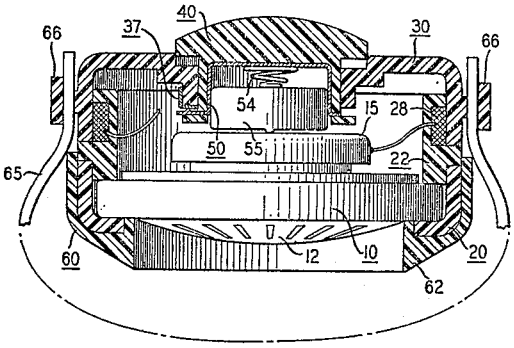

The adapter is designed to facilitate the use of a hearing aid with a handset that contains a shielded receiver, such a receiver having too low a stray magnetic field to permit the telephone pickup coil provided with most hearing aids to work effectively. The adapter comprises a carbon transmitter that is acoustically coupled to the receiver and electrically connected in series with a battery, on-off switch, and coil. A modulated magnetic field is produced by the coil and this field can then be sensed by the telephone pickup of the hearing aid.

Nov. 24, 1970

G. L. SPAHN

T880003

ADAPTER FOR TELEPHONE RECEIVERS HAVING A SMALL STRAY MAGNETIC FIELD

Filed May 5, 1969

2 Sheets-Sheet 1

INVENTOR
G. L. SPAHN
BY
Harry L. Newman
ATTORNEY